United States Patent
Sydow et al.

(10) Patent No.: US 12,455,808 B2
(45) Date of Patent: Oct. 28, 2025

(54) DUPLICATE INCIDENT DETECTION USING DYNAMIC SIMILARITY THRESHOLD

(71) Applicant: Dell Products L.P., Round Rock, TX (US)

(72) Inventors: David C. Sydow, Merrimack, NH (US); Anil Kumar Koluguri, Durham, NC (US); Jeremy Denis White, Londonderry, NH (US); Shobhit Nitinkumar Dutia, Westborough, MA (US); Duhita Mulky Avinash, Melrose, MA (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/970,262

(22) Filed: Oct. 20, 2022

(65) Prior Publication Data
US 2024/0134774 A1   Apr. 25, 2024
US 2024/0232048 A9   Jul. 11, 2024

(51) Int. Cl.
*G06F 8/70* (2018.01)
*G06F 8/71* (2018.01)
(Continued)

(52) U.S. Cl.
CPC ............ *G06F 11/3616* (2013.01); *G06F 8/71* (2013.01); *G06F 16/215* (2019.01); *G06F 16/2379* (2019.01)

(58) Field of Classification Search
CPC ............... G06F 11/3616; G06F 16/215; G06F 16/2379; G06F 8/71
See application file for complete search history.

(56) References Cited

U.S. PATENT DOCUMENTS 10,089,213 B1* 10/2018 Noble .................. G06F 11/366
11,379,526 B2   7/2022 Srinivas
(Continued)

FOREIGN PATENT DOCUMENTS

EP   4250133 A1 *  9/2023 ........... G06F 16/353

OTHER PUBLICATIONS

Y.-B. Kang et al., "A computer-facilitated method for matching incident cases using semantic similarity measurement," 2009 IFIP/IEEE International Symposium on Integrated Network Management—Workshops, New York, NY, USA, 2009, pp. 10-19, doi: 10.1109/INMW.2009.5.*

(Continued)

*Primary Examiner* — Hanh Thi-Minh Bui
(74) *Attorney, Agent, or Firm* — Ryan, Mason & Lewis, LLP

(57) ABSTRACT

Methods, apparatus, and processor-readable storage media for duplicate incident detection using a dynamic similarity threshold are provided herein. An example computer-implemented method includes obtaining a request including information associated with tracking at least a first incident in a database; generating a first representation of the first incident that encodes at least a portion of the information; computing a set of similarity scores for the first incident, where a given similarity score is based on a comparison between the first representation and a second representation generated for one of a plurality of additional incidents in the database; detecting that the first incident is a duplicate of at least one of the plurality of additional incidents based on a comparison of the set of similarity scores to a similarity threshold, where the similarity threshold is updated over time; and initiating an update in the database in response to the detecting.

20 Claims, 8 Drawing Sheets

(51) Int. Cl.
    *G06F 11/3604*     (2025.01)
    *G06F 16/215*     (2019.01)
    *G06F 16/23*     (2019.01)

(56) References Cited

U.S. PATENT DOCUMENTS

| | | | |
|---|---|---|---|
| 2011/0066908 A1* | 3/2011 | Bartz | H04L 41/0631 |
| | | | 714/E11.01 |
| 2021/0124876 A1 | 4/2021 | Kryscinski | |
| 2021/0232387 A1* | 7/2021 | Hicks | G06F 16/23 |
| 2022/0164200 A1* | 5/2022 | Ganhotra | G06F 40/216 |
| 2022/0180247 A1* | 6/2022 | Chow | G06N 20/00 |
| 2023/0419017 A1 | 12/2023 | Fabbri | |

OTHER PUBLICATIONS

"How to Find Duplicates in Jira?", https://reliex.com/blog/how-to-find-duplicates-in-jira/, Reliex OÜ, available at: https://reliex.com/blog/how-to-find-duplicates-in-jira/ (last accessed Oct. 20, 2022).

Devlin, Jacob, et al., "BERT: Pre-training of Deep Bidirectional Transformers for Language Understanding," arXiv preprint arXiv:1810.04805, Oct. 11, 2018.

Lewis, Mike, et al., "BART: Denoising Sequence-To-Sequence Pre-training for Natural Language Generation, Translation, and Comprehension," arXiv preprint arXiv:1910.13461, Oct. 29, 2019.

Liu, Yinhan, et al., "RoBERTa: A Robustly Optimized BERT Pretraining Approach," arXiv preprint arXiv:1907.11692, Jul. 26, 2019.

\* cited by examiner

| INDEX | INCIDENT PAIR | SIMILARITY SCORE | DETECTED DUPLICATE | LABELED DUPLICATE |
|---|---|---|---|---|
| 1 | (a,b) | 1.000 | TRUE | TRUE |
| 2 | (a,b) | 0.800 | TRUE | TRUE |
| 3 | (a,c) | 0.555 | TRUE | FALSE |
| 4 | (a,d) | 0.333 | FALSE | FALSE |
| ⋮ | ⋮ | ⋮ | ⋮ | ⋮ |

DUPLICATE INCIDENT DETECTION USING DYNAMIC SIMILARITY THRESHOLD

FIELD

The field relates generally to information processing systems, and more particularly to managing incidents using such systems.

BACKGROUND

Issue tracking systems generally refer to systems that can manage and maintain information related to issues or other incidents. For example, such systems are often used to track software errors and/or flaws in software development projects.

SUMMARY

Illustrative embodiments of the disclosure provide techniques for duplicate incident detection using a dynamic similarity threshold. An exemplary computer-implemented method includes obtaining a request comprising information associated with tracking at least a first incident in an incident database; generating a first representation of the first incident that encodes at least a portion of the information; computing a set of one or more similarity scores for the first incident, wherein a given similarity score in the set is based at least in part on a comparison between the first representation and a second representation generated for one of a plurality of additional incidents in the incident database; detecting that the first incident is a duplicate of at least one of the plurality of additional incidents based on a comparison of the set of similarity scores to a similarity threshold; and in response to the detecting, initiating an update to at least one of the first incident and the at least one of the plurality of additional incidents in the incident database.

Illustrative embodiments can provide significant advantages relative to conventional incident management techniques. For example, technical problems associated with detecting duplicate incidents are mitigated in one or more embodiments by automatically identifying duplicate incidents based on similarity scores computed using data collected for such incidents and comparing the similarity scores to a dynamic similarity threshold.

These and other illustrative embodiments described herein include, without limitation, methods, apparatus, systems, and computer program products comprising processor-readable storage media.

BRIEF DESCRIPTION OF THE DRAWINGS

FIG. 3 shows an example of a confusion matrix in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Effectively tracking incidents for complex projects (e.g., software projects) can be technically challenging. As an example, for a given software project, many developers can submit code to one or more code databases. During the development process, the submitted code can include errors, which can be tracked using incident or ticket tracking systems, for example. A significant portion of the tracked incidents are frequently duplicates. In this context and elsewhere herein, the term "duplicates" is intended to be broadly construed so as to encompass two or more data structures that are created for a same or a substantially similar issue or other incident. Such data structures can comprise information identifying and/or describing an issue or other incident (e.g., title, one or more descriptions, comments, and/or other information related to tracking such incidents).

Identifying and managing duplicate incidents can be time consuming and inefficient. For example, if two or more tickets are created for a single software error then multiple developers may be assigned to triage the same software error. Additional computing resources are also needed to create, store, and manage such tickets. Conventional approaches for detecting duplicate tickets generally include applying one or more static sets of rules to incident logs. Such rules are difficult to create and manage, and often do not consider input that is provided from end-users (e.g., comments about such incidents).

One or more embodiments described herein include techniques for detecting duplicate incidents tracked in a database (e.g., an incident database) based on a dynamic similarity threshold. In some embodiments, the techniques can be integrated into a common incident tracking framework, which can help reduce the amount of time and resources that are needed.

Figure 1:
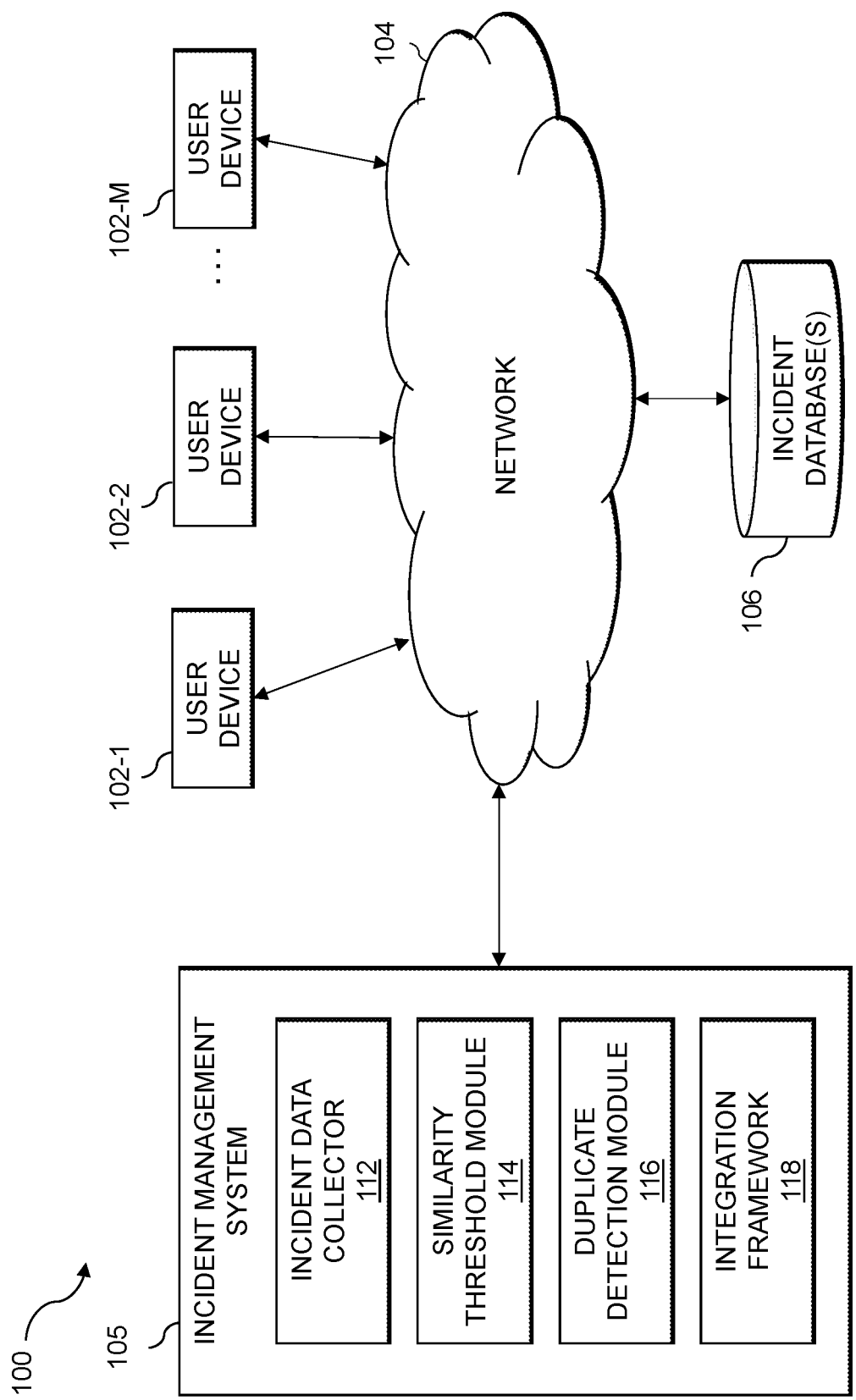
FIG. 1 shows an information processing system configured for duplicate incident detection using a dynamic similarity threshold in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is an incident management system 105.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the incident management system 105 can have at least one associated incident database 106 configured to store data pertaining to, for example, tracked incidents.

An example incident database 106, such as depicted in the present embodiment, can be implemented using one or more storage systems associated with the incident management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the incident management system 105 are one or more input-output devices, which illustratively comprise keyboards, displays or other types of input-output devices in any combination. Such input-output devices can be used, for example, to support one or more user interfaces to the incident management system 105, as well as to support communication between incident management system 105 and other related systems and devices not explicitly shown.

Additionally, the incident management system 105 in the FIG. 1 embodiment is assumed to be implemented using at least one processing device. Each such processing device generally comprises at least one processor and an associated memory, and implements one or more functional modules for controlling certain features of the incident management system 105.

More particularly, the incident management system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the incident management system 105 to communicate over the network 104 with the user devices 102, and illustratively comprises one or more conventional transceivers.

The incident management system 105 further comprises an incident data collector 112, a similarity threshold module 114, a duplicate detection module 116, and, optionally, an integration framework 118.

Generally, the incident data collector 112 includes functionality for collecting relevant incident data (e.g., from the incident database 106), and groups the words into a format so that they can be compared. As an example, the incident data collector 112 can generate a series of weighted vectors using a term frequency-inverse document frequency (TF-IDF) process, where each weighted vector represents a separately tracked incident from the incident database 106, and can also collect other feature data for classifying the incidents. A TF-IDF process generally defines an importance of a given keyword or phrase within a document (e.g., information collected for a given incident) by computing a product of a term frequency statistic (indicating the frequency of a given term within a given document) and an inverse document frequency statistic (indicating how common a given term is across a plurality of documents). The similarity threshold module 114 determines a threshold at which an incident is to be labeled as a duplicate.

The duplicate detection module 116 evaluates whether or not a new (e.g., unlabeled) incident that is to be tracked is a duplicate of at least one prior tracked incident based at least in part on the threshold determined by the similarity threshold module 114.

In one or more embodiments, the at least one incident database 106 can be managed using one or more incident tracking platforms (not explicitly shown in FIG. 1). In such embodiments, the integration framework 118 can use one or more application programming interfaces (APIs) to read and write to and from the incident database 106. For example, the integration framework 118 can send notifications of duplicate incidents maintained in the incident database 106 and/or perform one or more actions related to incidents managed by such platforms, as explained in more detail in conjunction with FIG. 5, for example.

It is to be appreciated that this particular arrangement of elements 112, 114, 116, and 118 illustrated in the incident management system 105 of the FIG. 1 embodiment is presented by way of example only, and alternative arrangements can be used in other embodiments. For example, the functionality associated with the elements 112, 114, 116 and 118 in other embodiments can be combined into a single module, or separated across a larger number of modules. As another example, multiple distinct processors can be used to implement different ones of the elements 112, 114, 116, and 118 or portions thereof.

At least portions of elements 112, 114, 116, and 118 may be implemented at least in part in the form of software that is stored in memory and executed by a processor.

It is to be understood that the particular set of elements shown in FIG. 1 for incident management system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the incident management system 105 and incident database(s) 106 can be on and/or part of the same processing platform. Additionally, it is to be appreciated that at least a portion of the incident management system 105 and/or incident database 106 can be implemented on one or more of the user devices 102.

An exemplary process utilizing elements 112, 114, 116, and 118 of an example incident management system 105 in computer network 100 will be described in more detail with reference to, for example, the flow diagram of FIG. 6.

One or more embodiments can include retrieving incident data corresponding to a plurality of incidents. For a given incident, the incident data may include, for example, one or more descriptions, a title of the incident, and/or one or more comments related to the given incident (e.g., provided by one or more users and/or developers). The incident data corresponding to each incident can be concatenated to form a text object (e.g., a text blob), for example. The text object can then be used to generate a representation that encodes the incident data. For example, the representation can be a TF-IDF vector, where the corpus of text used to generate the TF-IDF vector corresponds to the comments, title, and/or description for the plurality of incidents, and a given document corresponds to the comments, title, and/or description for one of the plurality of incidents. In some embodiments, the incident data for a given incident may also include an incident reporter, a location of the incident, and/or release or version information.

As an example, a given TF-IDF vector can include a specified number of common terms and uncommon terms resulting from the TF-IDF analysis. Additionally, in at least some embodiments, the incident data may include labels for at least a portion of incident data that identifies whether or not a pair of incidents are duplicate incidents. Such information can improve the initial quality of the TF-IDF, such as when the process is being implemented after an initial software release.

Some embodiments include determining a similarity threshold based on TF-IDF vectors generated for a plurality of incidents. As an example, each of a plurality of incidents can be assigned a linear distance between every other one of the plurality of incidents using a similarity score (e.g., a cosine similarity) between their respective TF-IDF vectors, as explained in more detail elsewhere herein. The similarity threshold can be used to determine whether a pair of the incidents are duplicates.

Figure 2:
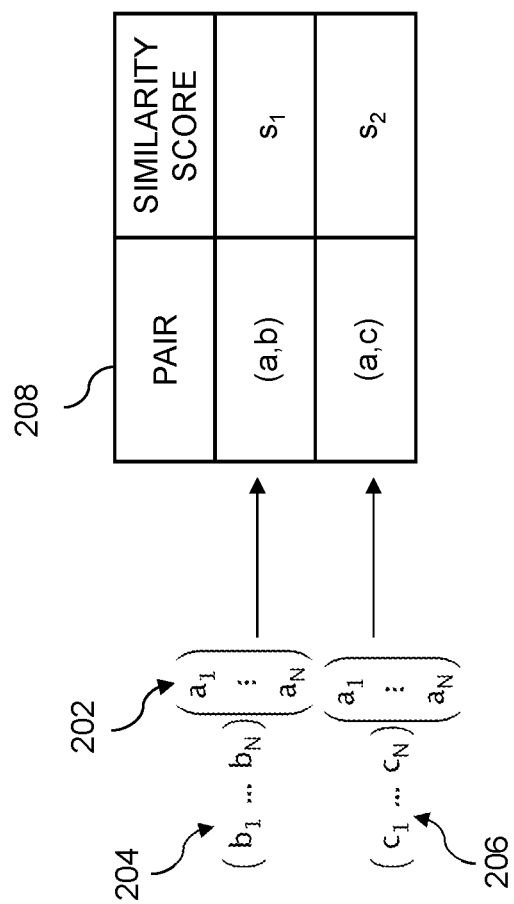
FIG. 2 shows an example of a process for identifying similarity between incidents in an illustrative embodiment.

Referring to FIG. 2, this figure shows an example of a process for identifying similarity between incidents in an illustrative embodiment. More specifically, a first vector 202, $\vec{a}=(a_1, \ldots, a_N)$, is generated based on incident data for a first incident, a second vector 204, $\vec{b}=(b_1, \ldots, b_N)$, is generated based on incident data for a second incident, and a third vector 206, $\vec{c}=(c_1, \ldots, c_N)$, is generated based on incident data for a third incident. In this example, a similarity score, $s_1$, is computed for vectors 202 and 204, and a similarity score, $s_2$, is computed for vectors 202 and 206, respectively. The similarity scores $s_1$ and $s_2$ are stored in a table 208. In some examples, the similarity scores are computed as a cosine similarity, for example. Although this example uses only three incidents, it is to be appreciated that there may be many more incidents in other examples.

In some embodiments, once the similarity scores between a plurality of defects in a database (e.g., N defects) are calculated, an N×N matrix is created. The N×N matrix includes a similarity score between each incident and every other incident in the database. The N×N similarity matrix, in some embodiments, can be combined with the set of pre-labeled duplicate incident data to create a confusion matrix.

In some embodiments, the pre-labeled duplicate incident data is split into a training set and a test set for purposes of training a machine learning model in a supervised manner. For example, the test set may include 67% of the pre-labeled incidents and the training set can include the remaining 33% of the pre-labeled incidents. The machine learning model can be trained using the training set to predict whether a given incident is a duplicate. The test data can then be used to verify whether the machine learning model satisfies one or more criteria (e.g., an accuracy threshold). As an example, the machine learning model can obtain a pair of vector representations of incidents as an input, and then output a prediction of whether or not the two incidents are duplicates. Those skilled in the art will appreciate that any suitable supervised machine learning model can be used, such as a logistic regression model.

FIG. 3 shows an example of a portion of a confusion matrix 300 in an illustrative embodiment. The confusion matrix 300 includes a first column having index values, a second column showing the incident pairs corresponding to the index values, and a third column having the corresponding similarity scores. The confusion matrix 300 also includes a column indicating whether each row corresponds to an incident pair that was detected as being duplicate (e.g., by the machine learning model) and whether the incident pair was labeled as a duplicate.

In at least some embodiments, the confusion matrix 300 can be used to determine the similarity threshold that is used to identify duplicate incidents. For example, the similarity threshold can be computed based on an average (e.g., mean) similarity of incidents that are labeled as duplicates. In some embodiments, the confusion matrix 300 can be revised over time based on, for example, user information that verifies whether at least one new incident is a duplicate incident, and then the similarity threshold can be updated to account for any new incidents. In at least one embodiment, different similarity thresholds can be separately calculated and used for multiple categories (e.g., by release and/or locations of such incidents). The one or more similarity thresholds can be used to identify defects, as described in more detail below.

Figure 4:
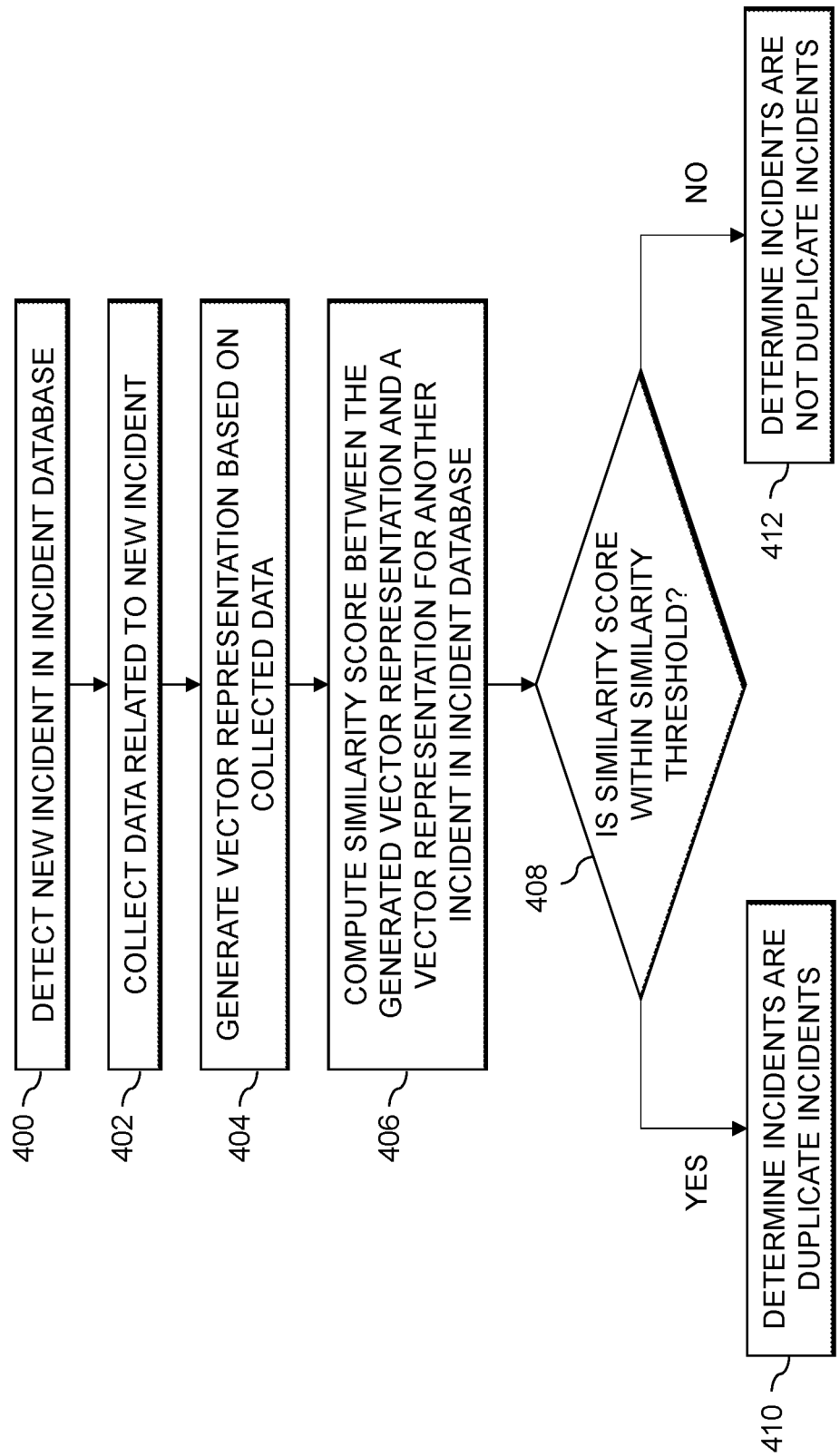
FIG. 4 shows an example of a similarity analysis process in an illustrative embodiment.

FIG. 4 shows an example of a process for detecting duplicate incidents in an illustrative embodiment. It is to be understood that this particular process is only an example, and additional or alternative processes can be carried out in other embodiments. In some embodiments, the process can be implemented at least in part by duplication detection module 116.

Step 400 includes detecting a new incident in an incident database. Step 402 includes collecting data related to the new incident.

Step 404 includes generating a vector representation based on the collected data.

Step 406 includes computing a similarity score between the vector representation generated for the new incident and a vector representation computed for another incident in the incident database. If there are multiple incidents in the incident database, then step 406 can include generating a matrix (e.g., a TF-IDF matrix) that includes the similarity scores between the vector representation computed for the new incident and respective vector representations of the multiple incidents (e.g., if there are N incidents in the defect database, then the matrix can be a 1×N matrix).

Step 408 includes a test that checks whether the computed similarity score is within a similarity threshold (as dynamically determined by the similarity threshold module 114, for example). If there are multiple incidents, then step 408 can be performed for each entry in the generated matrix.

If the result of step 408 is yes, then step 410 includes determining that the incidents are duplicate incidents. If the result of step 408 is no, then step 412 includes determining that the incidents are not duplicate incidents.

Figure 5:
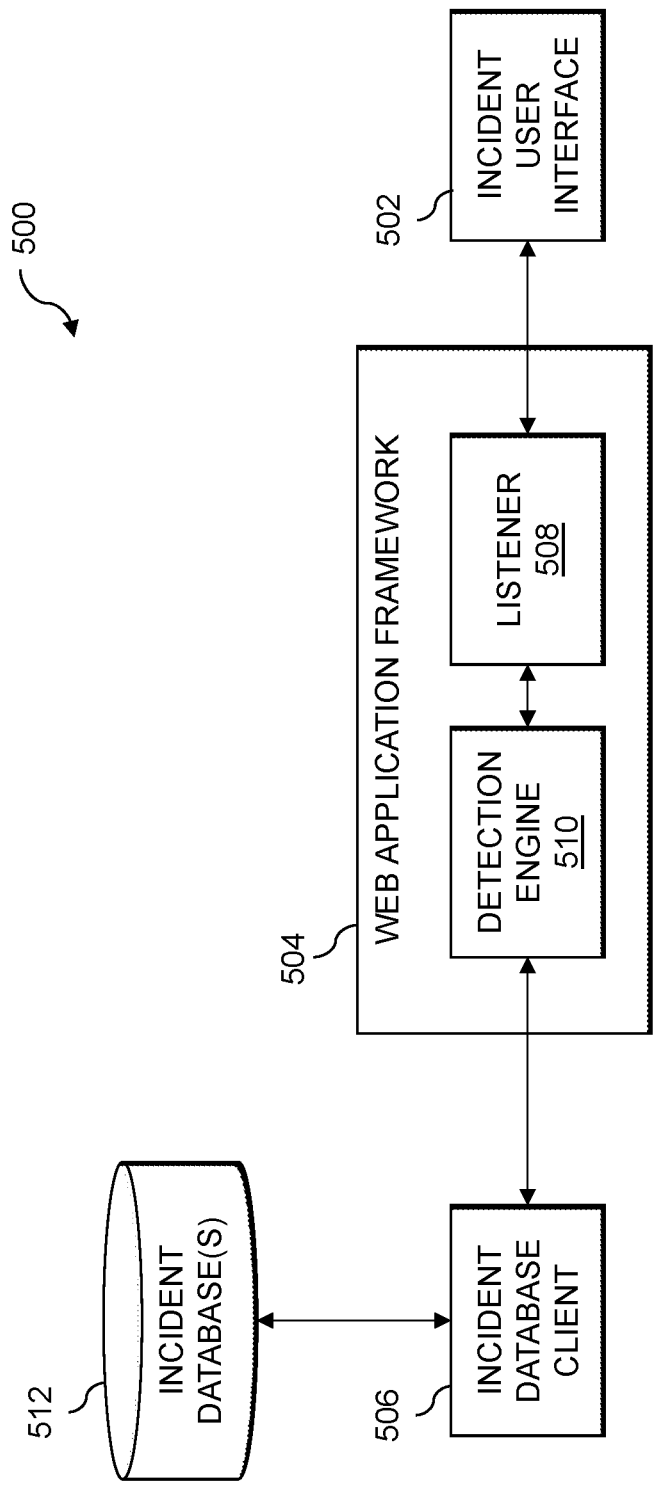
FIG. 5 shows an example of an integration framework in an illustrative embodiment.

FIG. 5 shows an example of an integration framework 500 in an illustrative embodiment. The integration framework 500 includes an incident user interface 502. The incident user interface 502 can include functionality for a user to create one or more incidents, and enter information related to such incidents, as described in more detail elsewhere herein. The integration framework 500 also includes a web application framework 504, an incident database client 506, and at least one incident database 512.

In this example, the web application framework 504 includes a listener 508 and a detection engine 510. The listener 508 detects different types of requests initiated by the incident user interface 502. As an example, the incident user interface 502 can include a first webhook that can enable the listener 508 to detect requests for creating new incidents in the incident database 512, and a second webhook can enable the listener 508 to detect requests for updating one or more incidents in the incident database 512.

In response to the listener 508 detecting a request for creating a new incident, the listener 508 marks the new incident as a candidate training sample, which can be used to determine one or more similarity thresholds, as described in more detail elsewhere herein.

Additionally, the detection engine 510 obtains information related to incidents stored in the at least one incident database 512 via the incident database client 506, and determines whether the new incident is a duplicate of an incident that is stored in the at least one incident database 512 (e.g., as described in conjunction with FIG. 4).

In response to the listener 508 detecting a request to update a new incident, the detection engine 510 checks whether the updated incident is a duplicate of an incident that is stored in the at least one incident database 512. It is noted that a request to create a new incident may include a limited amount of information about the incident, which can make it difficult to detect any duplicates. Thus, the detection engine 510 can improve over time as it analyzes incidents in the at least one incident database 512 as they are updated with new comments and/or other new information, for example.

Additionally, if the detection engine 510 detects that a duplicate incident is found from a new or updated incident request, it can tag or post a comment using one or more APIs associated with incident database client 506, for example. As an example, a comment can be added to the new or updated incident, which includes at least one of: one or more detected duplicate incidents, one or more links to the detected duplicate incidents, and respective confidence levels of the detected duplicate incidents. In at least some embodiments, similar information can also be added to the detected incidents.

Figure 6:
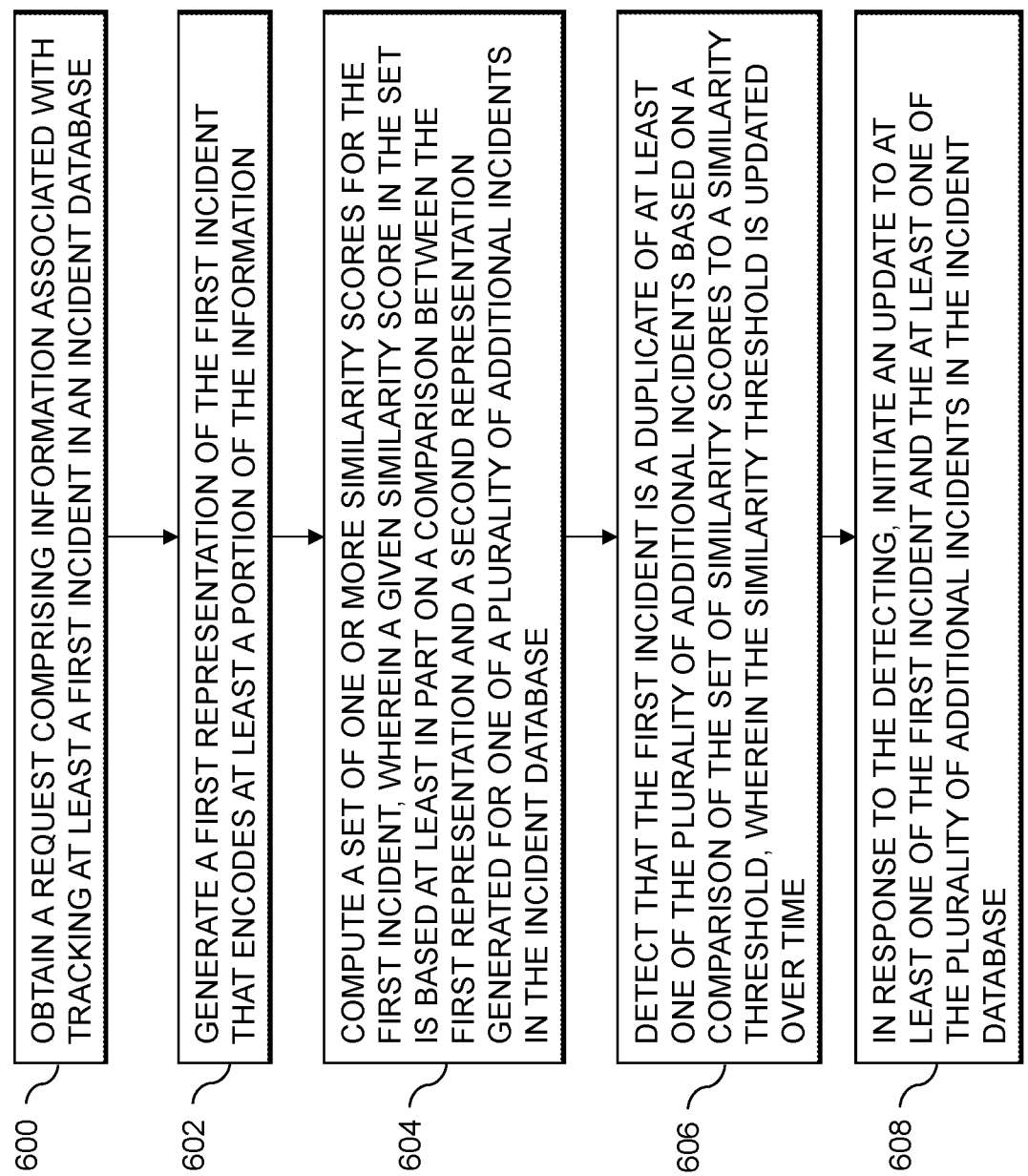
FIG. 6 shows a flow diagram of a process for duplicate incident detection using a dynamic similarity threshold in an illustrative embodiment.

FIG. 6 is a flow diagram of a process for duplicate incident detection using a dynamic similarity threshold in an illustrative embodiment. It is to be understood that this particular process is only an example, and additional or alternative processes can be carried out in other embodiments.

In this embodiment, the process includes steps 600 through 608. These steps are assumed to be performed by the incident management system 105 utilizing at least its elements 112, 114 and 116.

Step 600 includes obtaining a request comprising information associated with tracking at least a first incident in an incident database. Step 602 includes generating a first representation of the first incident that encodes at least a portion of the information. Step 604 includes computing a set of one or more similarity scores for the first incident, wherein a given similarity score in the set is based at least in part on a comparison between the first representation and a second representation generated for one of a plurality of additional incidents in the incident database. Step 606 includes detecting that the first incident is a duplicate of at least one of the plurality of additional incidents based on a comparison of the set of similarity scores to a similarity threshold, wherein the similarity threshold is updated over time. Step 608 includes, in response to the detecting, initiating an update to at least one of the first incident and the at least one of the plurality of additional incidents in the incident database.

The first incident may relate to a software defect in one or more software code repositories.

The information associated with tracking the first incident may include at least one of: a title of the first incident; one or more user comments related to the software defect; a location of the software defect within software code associated with the one or more software code repositories; and a release version corresponding to the first incident. The similarity threshold may be separately determined for at least one of: the release version corresponding to the first incident and the location of the software defect. The first representation may be generated using a term frequency-inverse document frequency process. The similarity threshold may be updated over time based at least in part on information provided by one or more users, where the information verifies that at least one of: the first incident in the incident database is a duplicate and two or more other incidents in the incident database are duplicates. The similarity threshold may be computed at least in part by: generating at least one representation for each of a plurality of incidents; computing similarity scores between each pair of representations of the plurality of representations; and calculating the similarity threshold based on the similarity scores corresponding to the pairs of incidents labeled as duplicates. The similarity scores between each pair of incidents may be computed based on a cosine similarity. The similarity threshold may be updated in response to detecting that the first incident is a duplicate of at least one of the plurality of additional incidents. The initiating the update may include at least one of: assigning a flag to at least one of the first incident and the at least one of the plurality of additional incidents in the incident database; adding one or more comments related to at least one of the first incident and the at least one of the plurality of additional incidents in the incident database; and performing a merge operation to combine the first incident and the at least one of the plurality of additional incidents in the incident database.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve incident management techniques. These and other embodiments can effectively overcome problems associated with existing techniques that generally rely on static rules to detect such duplicates. For example, some embodiments are configured to implement machine learning techniques that can automatically identify duplicate incidents based on similarity scores computed based on data collected for such incidents, and a comparison of the similarity scores to a dynamic similarity threshold. These and other embodiments can effectively improve how incidents are managed relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
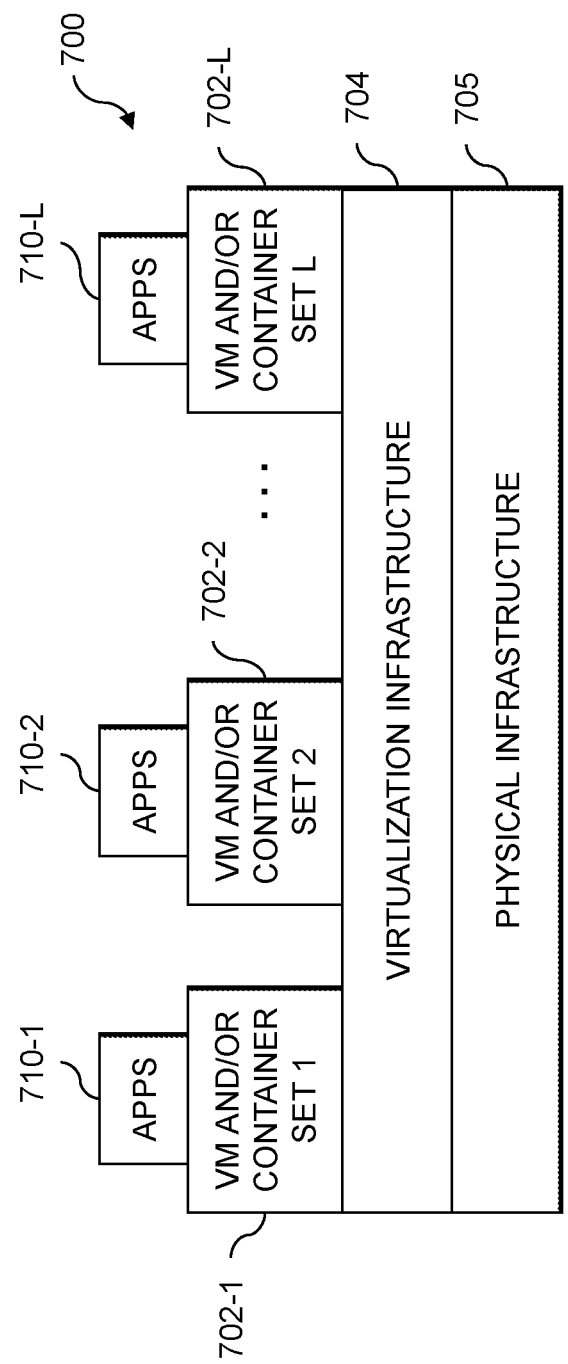
FIGS. 7 and 8 show examples of processing platforms that may be utilized to implement at least a portion of an information processing system in illustrative embodiments.
Figure 8:
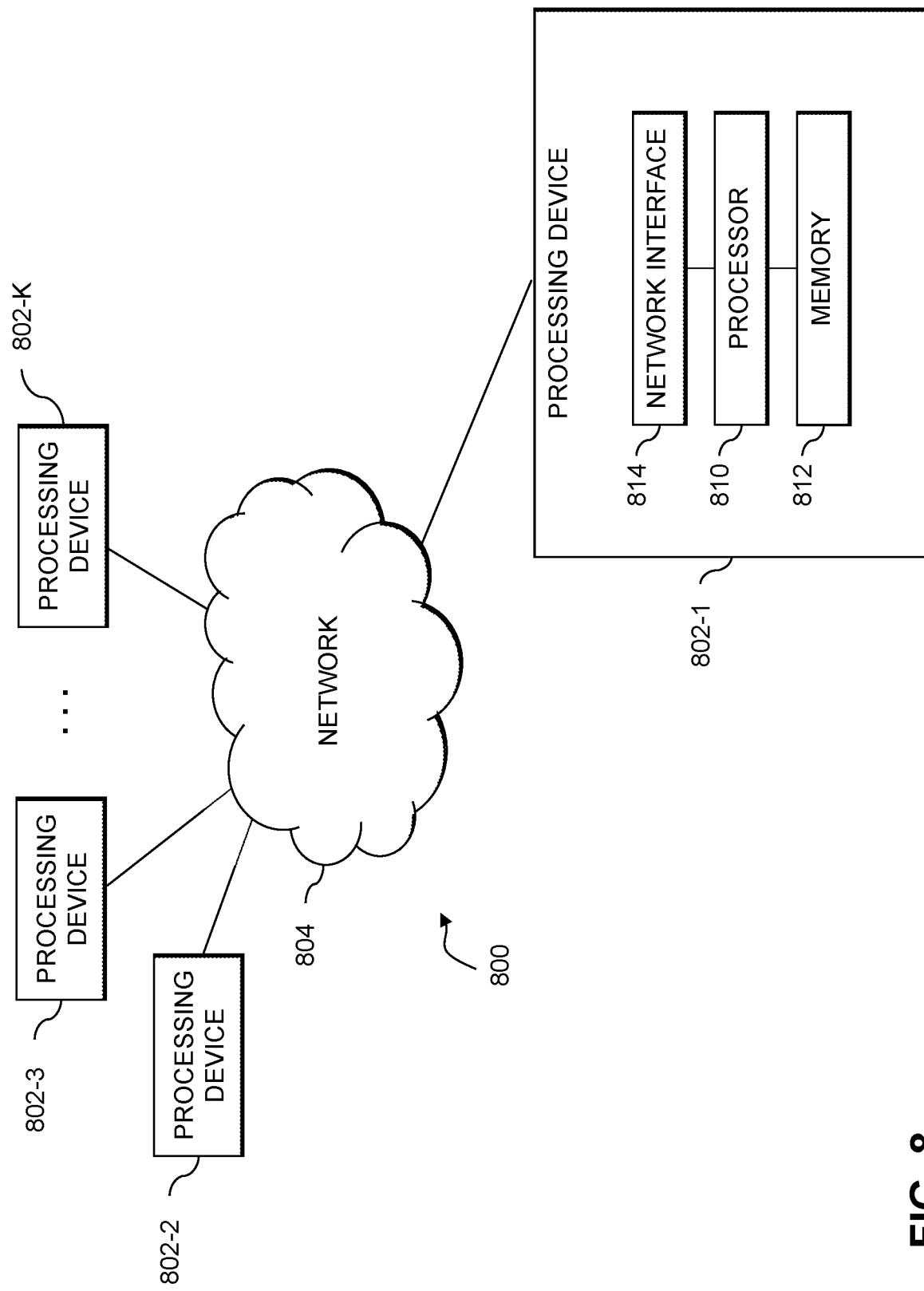

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an ASIC, an FPGA or other type of processing circuitry, as well as portions or combinations of such circuitry elements.

The memory 812 comprises RAM, ROM or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining a request comprising information associated with tracking at least a first incident in an incident database;
generating a first numeric representation of the first incident that encodes at least a portion of the information;
computing a set of one or more similarity scores for the first incident, wherein a given similarity score in the set is based at least in part on a comparison between the first numeric representation and a second numeric representation generated for one of a plurality of additional incidents in the incident database;
detecting that the first incident is a duplicate of at least one of the plurality of additional incidents based on a comparison of the set of similarity scores to a similarity threshold, wherein the similarity threshold is dynamically updated over time based on at least one of: one or more updates to one or more of the additional incidents in the incident database and one or more new incidents added to the incident database; and
in response to the detecting, initiating an update to the incident database, wherein the update comprises at least one of: (i) assigning a flag to at least one of: (a) the first incident and (b) the at least one of the plurality of additional incidents as being a duplicate incident, and (ii) merging the first incident and the at least one of the plurality of additional incidents in the incident database;

wherein the method is performed by at least one processing device comprising a processor coupled to a memory.

2. The computer-implemented method of claim 1, wherein the first incident relates to a software defect in one or more software code repositories, and wherein the information associated with tracking the first incident comprises at least one of:

a title of the first incident;

one or more user comments related to the software defect;

a location of the software defect within software code associated with the one or more software code repositories; and a release version corresponding to the first incident.

3. The computer-implemented method of claim 2, wherein the similarity threshold is separately determined for at least one of: the release version corresponding to the first incident and the location of the software defect.

4. The computer-implemented method of claim 1, wherein the first numeric representation comprises a vector representation that is generated using a term frequency-inverse document frequency process.

5. The computer-implemented method of claim 1, wherein the similarity threshold is updated over time based at least in part on information provided by one or more users, wherein the information verifies that at least one of: (i) the first incident in the incident database is the duplicate of the at least one of the plurality of additional incidents and (two or more other incidents in the incident database are duplicates.

6. The computer-implemented method of claim 1, wherein the similarity threshold is computed at least in part by:

generating at least one numeric representation for each of the plurality of additional incidents, wherein at least a portion of the plurality of additional incidents are labeled as duplicate incidents;

computing similarity scores between each pair of numeric representations of the plurality of numeric representations, wherein the computing comprises computing a cosine similarity between each pair of numeric representations of the plurality of numeric representations; and calculating the similarity threshold based on the similarity scores corresponding to the pairs of incidents labeled as duplicates.

7. The computer-implemented method of claim 1, wherein the similarity threshold is updated in response to detecting that the first incident is the duplicate of the at least one of the plurality of additional incidents.

8. The computer-implemented method of claim 1, wherein the initiating the update to the incident database, further comprises:

adding one or more comments related to at least one of the first incident and the at least one of the plurality of additional incidents in the incident database.

9. The computer-implemented method claim 1, wherein the similarity threshold is dynamically updated by recomputing a value based on an average similarity of incident pairs currently labeled as duplicates in the incident database.

10. The computer-implemented method of claim 1, wherein the similarity threshold is applied across each incident in the incident database.

11. A non-transitory processor-readable storage medium having stored therein program code of one or more software programs, wherein the program code when executed by at least one processing device causes the at least one processing device:

to obtain a request comprising information associated with tracking at least a first incident in an incident database;

to generate a first numeric representation of the first incident that encodes at least a portion of the information;

to compute a set of one or more similarity scores for the first incident, wherein a given similarity score in the set is based at least in part on a comparison between the first numeric representation and a second numeric representation generated for one of a plurality of additional incidents in the incident database;

to detect that the first incident is a duplicate of at least one of the plurality of additional incidents based on a comparison of the set of similarity scores to a similarity threshold, wherein the similarity threshold is dynamically updated over time based on at least one of: one or more updates to one or more of the additional incidents in the incident database and one or more new incidents added to the incident database; and in response to the detecting, to initiate an update to the incident database, wherein the update comprises at least one of: (i) assigning a flag to at least one of: (a) the first incident and (b) the at least one of the plurality of additional incidents as being a duplicate incident, and (ii) merging the first incident and the at least one of the plurality of additional incidents in the incident database.

12. The non-transitory processor-readable storage medium of claim 11, wherein the first incident relates to a software defect in one or more software code repositories.

13. The non-transitory processor-readable storage medium of claim 12, wherein the information associated with tracking the first incident comprises at least one of:

a title of the first incident;

one or more user comments related to the software defect;

a location of the software defect within software code associated with the one or more software code repositories; and a release version corresponding to the first incident.

14. The non-transitory processor-readable storage medium of claim 13, wherein the similarity threshold is separately determined for at least one of: the release version corresponding to the first incident and the location of the software defect.

15. The non-transitory processor-readable storage medium of claim 11, wherein the similarity threshold is updated over time based at least in part on information provided by one or more users, wherein the information verifies that at least one of: (i) the first incident in the incident database is the duplicate of the at least one of the plurality of additional incidents and (ii) two or more other incidents in the incident database are duplicates.

16. The non-transitory processor-readable storage medium of claim 11, wherein the similarity threshold is computed at least in part by:

generating at least one numeric representation for each of the plurality of additional incidents, wherein at least a portion of the plurality of additional incidents are labeled as duplicate incidents;

computing similarity scores between each pair of numeric representations of the plurality of numeric representations; and calculating the similarity threshold based on the similarity scores corresponding to the pairs of incidents labeled as duplicates.

17. An apparatus comprising:

at least one processing device comprising a processor coupled to a memory;

the at least one processing device being configured:

to obtain a request comprising information associated with tracking at least a first incident in an incident database;

to generate a first numeric representation of the first incident that encodes at least a portion of the information;

to compute a set of one or more similarity scores for the first incident, wherein a given similarity score in the set is based at least in part on a comparison between the first numeric representation and a second numeric representation generated for one of a plurality of additional incidents in the incident database;

to detect that the first incident is a duplicate of at least one of the plurality of additional incidents based on a comparison of the set of similarity scores to a similarity threshold, wherein the similarity threshold is dynamically updated over time based on at least one of: one or more updates to one or more of the additional incidents in the incident database and one or more new incidents added to the incident database; and in response to the detecting, to initiate an update to the incident database, wherein the update comprises at least one of: (i) assigning a flag to at least one of: (a) the first incident and (b) the at least one of the plurality of additional incidents as being a duplicate incident, and (ii) merging the first incident and the at least one of the plurality of additional incidents in the incident database.

18. The apparatus of claim 17, wherein the first incident relates to a software defect in one or more software code repositories.

19. The apparatus of claim 17, wherein the similarity threshold is updated over time based at least in part on information provided by one or more users, wherein the information verifies that at least one of: the first incident in the incident database is a duplicate and two or more other incidents in the incident database are duplicates.

20. The apparatus of claim 17, wherein the similarity threshold is computed at least in part by:

generating at least one numeric representation for each of a plurality of incidents, wherein at least a portion of the plurality of incidents are labeled as duplicates;

computing similarity scores between each pair of numeric representations of the plurality of numeric representations; and calculating the similarity threshold based on the similarity scores corresponding to the pairs of incidents labeled as duplicates.

* * * * *